United States Patent
Matsuda et al.

(10) Patent No.: US 9,448,512 B2
(45) Date of Patent: Sep. 20, 2016

(54) DRIVE SYSTEM AND IMAGE FORMING APPARATUS INCLUDING SAME

(71) Applicants: Naoki Matsuda, Kanagawa (JP); Masahiro Ishida, Kanagawa (JP); Jun Yasuda, Chiba (JP); Shinya Shimizu, Kanagawa (JP)

(72) Inventors: Naoki Matsuda, Kanagawa (JP); Masahiro Ishida, Kanagawa (JP); Jun Yasuda, Chiba (JP); Shinya Shimizu, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/463,926

(22) Filed: Aug. 20, 2014

(65) Prior Publication Data
US 2015/0060191 A1    Mar. 5, 2015

(30) Foreign Application Priority Data

Sep. 3, 2013 (JP) .................................. 2013-181971
Sep. 10, 2013 (JP) .................................. 2013-187129
Mar. 12, 2014 (JP) .................................. 2014-048946

(51) Int. Cl.
G03G 15/00 (2006.01)
G03G 15/16 (2006.01)
F16F 15/02 (2006.01)
G03G 21/16 (2006.01)
G03G 15/01 (2006.01)

(52) U.S. Cl.
CPC ........... *G03G 15/1615* (2013.01); *F16F 15/02* (2013.01); *G03G 21/1647* (2013.01); *G03G 15/0178* (2013.01); *G03G 15/5008* (2013.01); *G03G 15/757* (2013.01); *G03G 2215/0119* (2013.01); *G03G 2221/1657* (2013.01)

(58) Field of Classification Search
CPC .................................. G03G 15/01; B41J 29/08
USPC .......................................................... 399/167
See application file for complete search history.

(56) References Cited

U.S. PATENT DOCUMENTS

| | | | |
|---|---|---|---|
| 7,751,746 B2* | 7/2010 | Miyawaki et al. | 399/107 |
| 2011/0058870 A1 | 3/2011 | Murakami et al. | |
| 2011/0170892 A1* | 7/2011 | Ishida et al. | 399/75 |
| 2012/0060633 A1* | 3/2012 | Ishida et al. | 74/413 |
| 2013/0101314 A1 | 4/2013 | Yasuda et al. | |
| 2013/0237366 A1 | 9/2013 | Yasuda et al. | |

FOREIGN PATENT DOCUMENTS

| | | | |
|---|---|---|---|
| JP | 64-005830 | 1/1989 | |
| JP | 3-240581 | 10/1991 | |
| JP | 03-240581 | * 10/1991 | ............. B41J 29/08 |
| JP | 2007-003964 | 1/2007 | |
| JP | 2009-164668 | 7/2009 | |

* cited by examiner

*Primary Examiner* — Clayton E Laballe
*Assistant Examiner* — Kevin Butler
(74) *Attorney, Agent, or Firm* — Harness, Dickey & Pierce, P.L.C.

(57) ABSTRACT

A drive system includes multiple vibrating members that tend to vibrate when these members are driven and a holding system to hold the multiple vibrating members. The holding system at least includes a first holding unit and a second holding unit superimposed on and partially connected to each other. The multiple vibrating members include a first vibrating member and a second vibrating member. The first vibrating member is held by the first holding unit and is not held by the second holding unit. The second vibrating member is held by the second holding unit and is not held by the first holding unit. At least one of the first vibrating member and the second vibrating member is a driving device to drive another member as a drive source.

14 Claims, 5 Drawing Sheets

DRIVE SYSTEM AND IMAGE FORMING APPARATUS INCLUDING SAME

CROSS-REFERENCE TO RELATED APPLICATIONS

This patent application is based on and claims priority pursuant to 35 U.S.C. §119(a) to Japanese Patent Application Nos. 2013-181971, filed on Sep. 3, 2013, 2013-187129, filed on Sep. 10, 2013, and 2014-048946, filed on Mar. 12, 2014 in the Japan Patent Office, the entire disclosures of which are hereby incorporated by reference herein.

BACKGROUND

1. Technical Field

This invention relates to a drive system and an image forming apparatus, such as a copier, a printer, a facsimile machine, or a multifunctional machine having multiple functions of these devices, etc., including the drive system.

2. Related Art

In an image forming apparatus, many drive systems (i.e., drive sources) are generally employed to execute an image forming operation. For example, these drive systems are used to drive a photosensitive body, a transfer belt, or the like, for example. These drive systems usually generate a noise during an image forming process, thereby raising a problem. That is, since many components are mechanically connected to each other, noise may occur due to vibration of these components or the like when drive force is transmitted to these components from the drive system.

Many attempts have been made to eliminate or reduce such noise. For example, as shown in FIG. 4, a motor 200 acting as a drive system provided in an image reading unit is fixed to a supporting plate 201 with a pair of motor fixing screws 202 to suppress vibration of a drive unit employed in an image forming apparatus. The supporting plate 201 is fixed to a housing, not shown, at three places via multiple vibration absorbers 203 using multiple supporting plate fixing screws 204, respectively, for example.

On a rear side of the supporting plate 201, opposite a front side on which the motor 200 is held, a drive force output gear, not shown, and a driving pulley 206 are placed. Drive force from the motor 200 is accordingly transmitted via the drive force output gear from the motor 200 to the driving pulley 206. The driving pulley 206 then transmits the drive force to a belt 207 wound therearound. In the conventional image reading unit, a tilting angle adjusting screw 210 is also disposed on the supporting plate 201 as well to adjust an inclination of the supporting plate 201 by changing a fastening degree thereof not to excessively tilt toward the housing. With this arrangement, amplification of the vibration of the supporting plate 201, generally caused when the position of the driving pulley 206 deviates and meshing with the belt 207 deteriorates, is inhibited.

In another conventional attempt, various vibrations occurring in an image forming apparatus are separated into those that generate low-frequency noise and those that generate the high-frequency noise generally deemed unpleasant, respectively. Then, the high-frequency sound is rendered inaudible by enlarging the low-frequency sound at the same time as a countermeasure to reduce the sound, movement of a motor is smoothed by reducing a stepping angle of the motor or sound occurring inside walls is absorbed by placing sound absorbing material thereon, for example.

These countermeasures taken to either absorb the above-described vibrations and/or the sound or obscure the high-frequency sounds or the like have been successful to a certain extent in suppressing noise in the conventional image forming apparatus. However, since there exist various types of image forming apparatuses each having multiple drive systems for driving various mechanisms, respectively, installed therein, the above-described countermeasures are not always completely effective for it is generally preferable to prepare various countermeasures against noise employable in a greater number of types of image forming apparatuses.

SUMMARY

Accordingly, one aspect of the present invention provides a novel drive system that includes: at least one vibrating member to generate vibration when it is driven; and a holding system to hold the at least one vibrating member. The holding system at least includes a first holding unit and a second holding unit superimposed on and partially connected to each other.

Another aspect of the present invention provides a novel image forming apparatus with a drive system that includes at least one vibrating member to generate vibration when it is driven and a holding system to hold the at least one vibrating member. The holding system at least includes a first holding unit and a second holding unit superimposed on and partially connected to each other.

BRIEF DESCRIPTION OF THE DRAWINGS

A more complete appreciation of the present invention and many of the attendant advantages thereof will be more readily obtained as substantially the same becomes better understood by reference to the following detailed description when considered in connection with the accompanying drawings, wherein.

DETAILED DESCRIPTION

Figure 1:
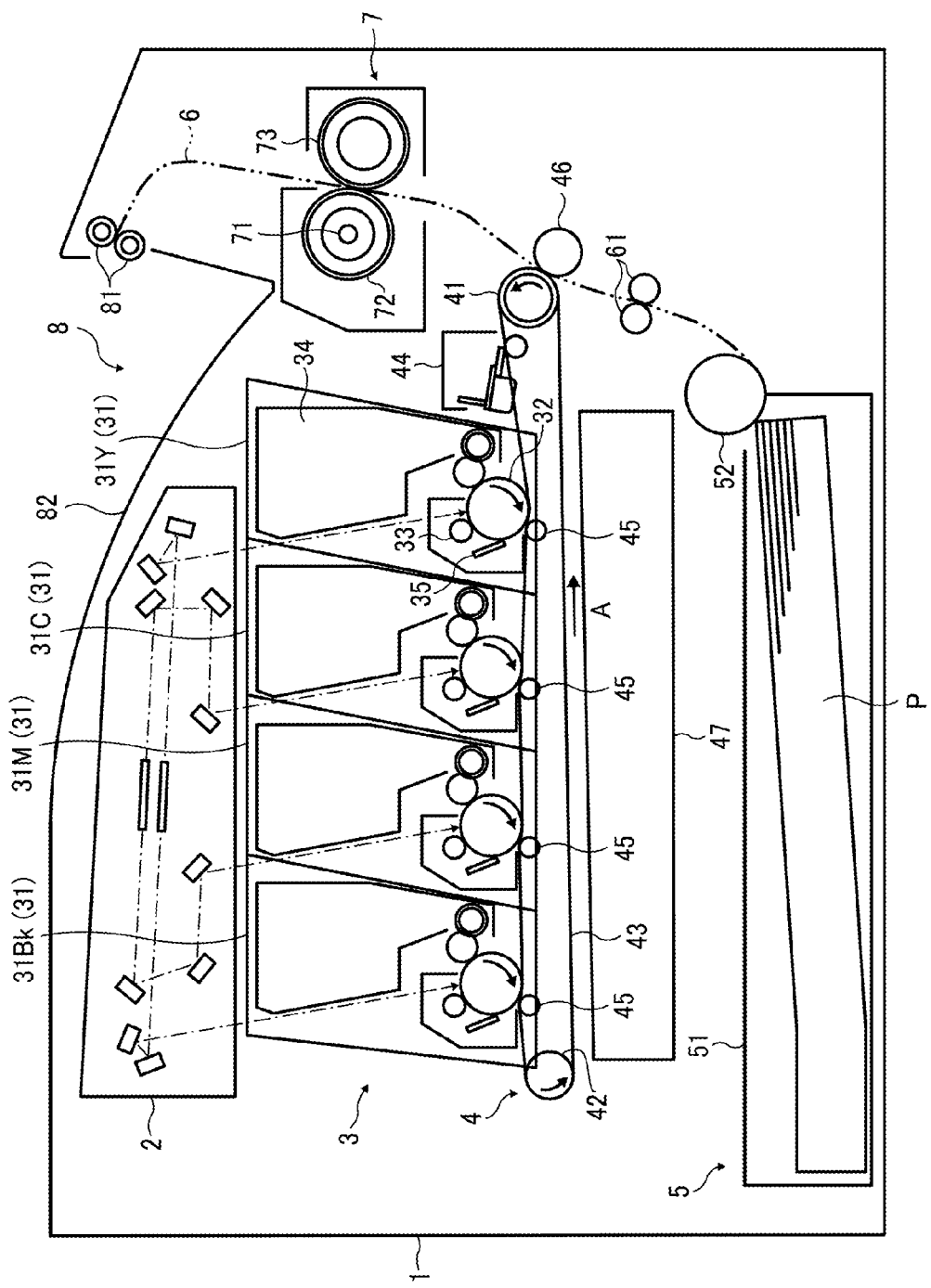
FIG. 1 is a diagram schematically illustrating an exemplary configuration of an image forming apparatus according to one embodiment of the present invention, to which various drive systems according to several practical examples are applied.

Referring now to the drawings, wherein like reference numerals designate identical or corresponding parts throughout the several views thereof and in particular to FIG. 1, an exemplary image forming apparatus 1 is configured by the below described various devices. That is, the image forming apparatus 1 may include an exposing unit 2, an image forming unit 3, a transferring unit 4, a sheet feeding unit 5, a sheet conveying path 6, a fixing unit 7, and a sheet ejecting unit 8 or the like as shown there.

The exposing unit 2 is located at an upper section in the image forming apparatus 1 and includes a light source that emits a laser light beam or the like and various optical systems or the like. Specifically, the exposing unit 2 irradiates a laser light beam generated based on image data obtained from an image acquiring device, not shown, per color separation component toward a photoconductor employed in an image forming unit 3 described later in detail and exposes a surface of the photoconductor.

The image forming unit 3 is located below the exposing unit 2 and has multiple processing units 31 detachably attached to the image forming apparatus 1. Each of the multiple processing units 31 is composed of a photoconductive drum 32 capable of bearing a toner image thereon, an electric charging roller 33 that uniformly charges a surface of the photoconductive drum 32, a developing unit 34 to supply toner onto a surface of the photoconductive drum 32, and a photoconductor cleaning blade 35 to clean the surface of the photoconductive drum 32, etc. Here, the multiple processing units 31 have four processing units 31 (i.e., 31Y, 31C, 31M, and 31Bk) corresponding to different component colors of yellow, cyan, magenta, and black (i.e., color separation components) of a color image. However, since these four processing units 31 (i.e., 31Y, 31C, 31M, and 31Bk) have substantially the similar configurations with each other except for accommodation of different color toner particles, respective reference alphabets are omitted herein after.

A transferring unit 4 is located beneath the image forming unit 3. The transferring unit 4 is composed of an endless intermediate transfer belt 43 stretched and suspended by a driving roller 41 and a driven roller 42 to be able to run therearound, a cleaning blade unit 44 for cleaning a surface of the intermediate transfer belt 43, and multiple primary transfer rollers 45 opposed to the photoconductive drums 32 of the respective processing units 31 across the intermediate transfer belt 43 or the like. The respective primary transferring rollers 45 press against an inner circumferential surface of intermediate transfer belt 43 at prescribed locations to form primary transferring nips between sections where the intermediate transfer belt 43 is thereby pressed and sections where the photoconductive drums 32 contact thereto, respectively.

A secondary transfer roller 46 is also disposed being opposed to the driving roller 41 wound by the intermediate transfer belt 43 across the intermediate transfer belt 43. The secondary transfer roller 46 is pressed against an outer circumferential surface of the intermediate transfer belt 43 to form a secondary transfer nip thereon at a position at which the secondary transfer roller 46 and the intermediate transfer belt 43 contact each other. A waste toner box 47 is also disposed below the intermediate transfer belt 43 to accommodate waste toner particles collected by the cleaning blade unit 44 from the intermediate transfer belt 43 via a waste toner transfer hose, not shown, when the intermediate transfer belt 43 is thereby cleaned.

The sheet feeding unit 5 is located at a lower section in the image forming apparatus 1 and includes a sheet feeding cassette 51 accommodating multiple recording sheets P and a sheet feeding roller 52 for carrying out the recording sheet P from the sheet feeding cassette 51 or the like.

A sheet conveying path 6 defining a sheet conveyance route is provided to convey the recording sheet P carried out from the sheet feeding unit 5. The sheet conveying path 6 includes a pair of registration rollers 61 and multiple pairs of conveyor rollers, not shown, optionally positioned upstream of the sheet ejecting unit 8 as described later more in detail.

A fixing unit 7 has a fixing roller 72 heated by a heating source 71 and a pressing roller 73 capable of pressing itself against the fixing roller 72 or the like.

The sheet ejecting unit 8 is provided most downstream of the sheet conveying path 6 in the image forming apparatus 1. In the sheet ejecting unit 8, there are provided a pair of sheet ejecting rollers 81 to drain the recording sheet P outside the image forming apparatus 1 and a sheet exiting tray 82 to stack the recording media drained by the pair of sheet ejecting rollers 81 thereon.

Now, an essential operation of the image forming apparatus 1 is d herein below describe in detail with reference to FIG. 1.

When image forming operation starts in the image forming apparatus 1, different multiple electrostatic latent images are formed on surfaces of the photoconductive drums 32 of the processing units 31Y, 32C, 31M, and 31BK, respectively. Image information to expose the surfaces of the respective photoconductive drums 32 are monochrome color image information obtained by dissolving a prescribed full-color image into respective image information of yellow, cyan, magenta, and black colors. Hence, when toner particles are supplied to those from the developing units 34, the respective electrostatic latent images formed on the photoconductive drums 32 are visualized to be corresponding toner images (i.e., developed images).

Subsequently, the intermediate transfer belt 43 is driven to run in a direction as shown by arrow A in the drawing as the driving roller 41 provided in the transferring unit 4 is driven and rotated counterclockwise in the drawing. To each of the primary transferring rollers 45, a voltage subjected to either constant voltage control or constant current control having a reverse polarity to a polarity of charged toner is applied. With this, an electric transferring field is formed in each of the primary transferring nips formed between the respective primary transferring rollers 45 and the photoconductive drum 32. Accordingly, color toner images formed on the respective photoconductive drums 32 of the processing units 31Y, 31M, 31C, and 31Bk are successively transferred and superimposed at a prescribed position on the intermediate transfer belt 43 by the electric transferring fields formed in the above-described primary transferring nips, respectively. Hence, a full-color toner image is formed on the surface of the intermediate transfer belt 43 in this way.

Whereas, when the image forming operation is initiated and accordingly the sheet feeding roller 52 of the sheet feeding unit 5 disposed in the lower section of the image forming apparatus 1 is driven and is rotated, the recording sheet P housed in the sheet feeding cassette 51 is sent out (i.e., launched) into the sheet conveying path 6. The recording sheet P sent out into the sheet conveying path 6 is timed by the pair of registration rollers 61, and is further sent to the secondary transferring nip formed between the secondary transfer roller 46 and the driving roller 41 opposed thereto. To the secondary transfer roller 46, a transfer voltage having a reverse polarity to a polarity of charged toner of a toner image borne on the intermediate transfer belt 43 is applied to form another electric transferring field in the secondary transfer nip. Accordingly, the toner image on the intermediate transfer belt 43 is transferred onto a recording sheet P in a block at once in the other electric transferring field formed in the secondary transfer nip.

The recording sheet P onto which the toner image is transferred is subsequently conveyed to the fixing unit 7. The recording sheet P is then heated by the fixing roller 72 heated by the heating source 71 and is pressed by a pressing roller 73, so that the toner image is fixed onto the recording sheet P. The recording sheet P with the fixed toner image thereon is subsequently separated from the fixing roller 72, and is further conveyed downstream thereof by a pair of conveyor rollers, not shown. The recording sheet P is subsequently ejected by the pair of sheet ejecting rollers 81 onto the sheet exiting tray 82 in the sheet ejecting unit 8. Here, residual toner adhering to the intermediate transfer belt 43 after the transfer process is subsequently removed therefrom by the cleaning blade unit 44 or the like. The removed toner is subsequently conveyed toward a waste toner box 47 by a screw or a waste toner transfer hose and the like, not shown, and is ultimately collected in the waste toner box 47.

Although the above-described image formation is executed to form the full-color image on the recording sheet P, the present invention is not limited thereto, and a monochromatic image can be formed by optionally using any one of the four processing units 31Y, 31C, 31M, and 31Bk. Otherwise, dual or trivalent color images can be formed by using two or three processing units out of the four processing units 31Y, 31C, 31M, and 31Bk as well.

Now, an exemplary drive unit according to one embodiment of the present invention is described with reference to FIGS. 2A and 2B and applicable drawings. In an image forming apparatus 1, multiple drive units are generally used in various image forming processes to drive and operate prescribed structures (i.e., systems) including a photoconductive drum 32, a driving roller 41 for driving an intermediate transfer belt 43, a sheet feeding mechanism, an image reading system, and a sheet ejecting system or the like.

Figure 2A:
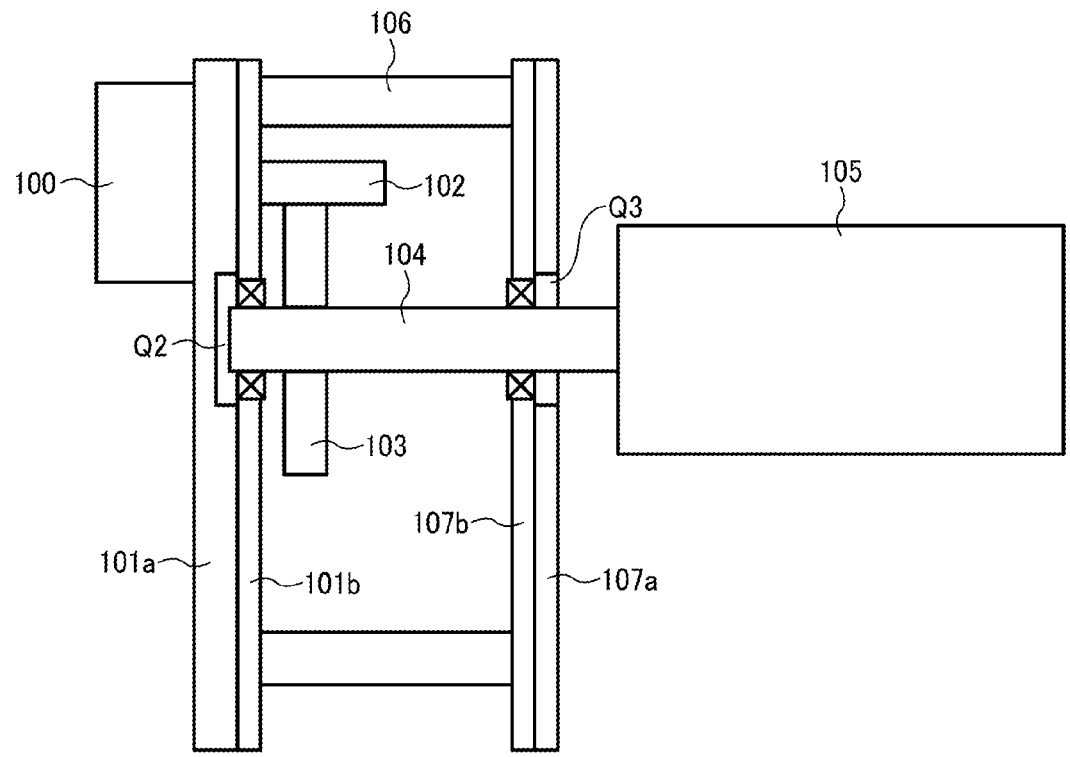
FIG. 2A is a cross-sectional view schematically illustrating a drive system according to a first embodiment of the present invention.

FIG. 2A is a cross-sectional view schematically illustrating a drive system according to a first embodiment of the present invention. As shown there, a motor 100 acting as a drive system (i.e., a first vibrating member) is held by a first plate 101a acting as a first holding unit. The motor 100 is connected to a driving target 105 through a motor gear 102, a gear 103, and a second driving shaft 104 acting as a second vibrating member. On an opposite side to the side in which the motor 100 is held (i.e., a side in which the driving target 105 is located), a second plate 107a and a second bracket 107b other than the first plate 101a and a first bracket 101b are provided. The first bracket 101b is connected to the second bracket 107b by a pair of studs 106.

The driving shaft 104 is held by the first bracket 101b acting as a second holding unit and the second bracket 107b as well. The driving shaft 104 accordingly functions to transmit drive force to the driving target 105 upon receiving it from the motor 100 through the motor gear 102 and the gear 103. The first plate 101a and the first bracket 101b, and the second plate 107a and the second bracket 107b are respectively superimposed on and partially coupled to each other via a structural device such as a nail, etc., or a fastener, such as a screw, etc. Hence, the plate 101a and the bracket 101b function as holding sections which hold the motor 100 and the driving shaft 104, respectively.

Figure 2B:
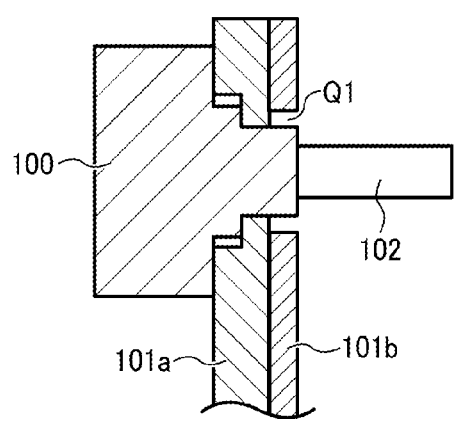
FIG. 2B is a cross-sectional view schematically illustrating a motor and a motor gear included in the drive system according to the first embodiment of the present invention.

FIG. 2B is a cross-sectional view schematically illustrating the motor 100 and the motor gear 102 taken when the first plate 101a holds the motor 100. As shown there, in the first bracket 101b, a first hole Q1 is formed at a section at which the motor gear 102 penetrates, so that the first bracket 101b contacts neither the motor 100 nor the motor gear 102. Because of this, the motor 100 is held by the first plate 101a, but is not held by the first bracket 101b. Similarly, as shown in FIG. 2A, since a second hole Q2 is also formed in the first plate 101a, the driving shaft 104 is held by the first bracket 101b, but is not directly held by the first plate 101a.

Thus, although vibration caused by the motor 100 when it operates is transmitted to the first plate 101a that holds the motor 100, it is not directly transferred to the first bracket 101b which does not contact the motor 100, accordingly. On the other hand, since the vibration caused by the motor 100 reaches the driving shaft 104 via the motor gear 102 and the gear 103 when the motor 100 operates and rotates the driving target 105 via the driving shaft 104. Hence, although vibration caused by rotation of the driving shaft 104 is transmitted to the first bracket 101b that holds the driving shaft 104, it is not transmitted directly to the first plate 101a that does not contact the driving shaft 104. With such a configuration, the first plate 101a directly receives transmission of the vibration from the motor 100, and the first bracket 101b also directly receives transmission of the vibration from the driving shaft 104, respectively. Specifically, the different members directly transmit the vibrations to the first plate 101a and the first bracket 101b, respectively. Since the first plate 101a and the first bracket 101b are only partially coupled together, these members do not synchronously vibrate in a body with each other even receiving the transmission of the vibration, phases of the vibrations of these members may be shifted from each other. Because of this, since these vibrations of the first plate 101a and the first bracket 101b interfere with each other, the vibrations of these members can be reduced. At the same time, vibrations to travel from these members to surroundings are also reduced similarly as well. Hence, since the first plate 101a and the first bracket 101b are superimposed on and partially being combined, the vibrations traveling from the motor 100 and the driving shaft 104 can be reduced. Thus, suppression of the vibration and reduction of the noise can be obtained at the same time in the holding sections, its peripheral mechanisms (i.e., the surroundings), and the entire drive system as well.

The second plate 107a also has a third hole Q3 therein and is accordingly configured not to contact the driving shaft 104. That is, the driving shaft 104 is held by the second bracket 107b at its one side end closer to the driving target 105. The second bracket 107b also holds the pair of studs 106 at the same side as holding the driving shaft 104 as well.

The pair of studs 106 is also held by the first bracket 101b at its opposite side ends to those held by the bracket 107b. As described above, because the vibration of the driving shaft 104 is communicated to it, the first bracket 101b also vibrates and transmits the vibration to the second bracket 107b through the pair of studs 106 as well.

Since the vibrations are communicated from the pair of studs 106 and the driving shaft 104 to it, the second bracket 107b accordingly vibrates as well. However, since it contacts neither the pair of studs 106 nor the driving shaft 104, the second plate 107a does not receive transmission of the vibration from them. However, the vibration is transmitted to the second plate 107a from the second bracket 107b superimposed thereon.

At this moment, since the second plate 107a and the second bracket 107b are superimposed on each other while only partially connected to each other as is similar to the relation between the first plate 101a and the first bracket 101b, the second plate 107a and the second bracket 107b do not synchronously vibrate in a body again and accordingly phases of vibrations of these members may be shifted from each other even receiving transmissions of vibrations, respectively. Hence, since the vibrations of these members interfere with each other, these vibrations are reduced with vibration absorbing effect. Accordingly, at this moment, the second plate 107a and the second bracket 107b act as first and second holding units, respectively, and receive the vibrations from two different vibrating members (i.e., the pair of studs 106 and the driving shaft 104).

Thus, when a difference in magnitude of vibration between two different members (e.g., a plate and a bracket) superimposed on each other is relatively small, the vibration can be cancelled or sufficiently reduced by superimposing these two members on each other. By contrast, however, when the difference in magnitude of vibration between two different members (e.g., a plate and a bracket) superimposed on each other is relatively large, since the larger vibration cannot be sufficiently cancelled or reduced, damper effect cannot be always sufficiently obtained. Therefore, it is desirable that the difference in magnitude of vibration between two different members is adjusted to decrease.

Here, because it can generally reduce vibration of a member if a rigidity of the member is enhanced, it is possible to adjust a difference in magnitude of vibration between two different members by enhancing the rigidity of one of the members that generates larger vibration than the other member.

When magnitudes of vibrations of the plate 101a or 107a and the bracket 101b or 107b of one embodiment of the present invention is compared with each other, the magnitude of the vibration of the bracket 101b or 107b is larger than that of the plate 101a or 107a, because the bracket 101b or 107b directly receives transmission of drive force via a meshing section of the bracket 101b or 107b which meshes with the driving shaft 104 and, by contrast, the plate 101a or 107a receives transmission of the vibration via a third member contacting thereto.

As described heretofore, according to one embodiment of the present invention, to the bracket 101b or 107b, only the driving shaft 104 is connected via the single gear 103. However, multiple gears are also commonly employed to connect to the bracket 101b or 107b, and a magnitude of vibration transmitted to the bracket 101b or 107b may increase in such a situation.

In view of the above-described context, it is recognized that a magnitude of each of vibrations transmitted to the first bracket 101b and the second bracket 107b each connected to the driving shaft 104 via the gear 103 tend to more easily grow than that transmitted to each of the plates 101a or 107a.

Because of this, in the drive system according to one embodiment of the present invention, rigidity of each of the brackets 101b and 107b is set higher than that of each of the plates 101a and 107a. With this, by reducing the difference in vibration between the bracket 101b or 107b and the plate 101a or 107a, vibration absorbing effect can be more effectively obtained.

Hence, in one embodiment of the present invention, a thickness of each of the brackets 101b and 107b is made thicker than each of the plates 101a and 107a, for example, to enhance the rigidity thereof. However, a method of enhancing the rigidity is not limited to the above-described example, and respective materials making these members 101b, 107b, 101a, and 107a can be changed to control the rigidity of each of the members 101b, 107b, 101a, and 107a, alternatively.

Hence, as described as a first situation in the first embodiment, the first and second holding units (i.e., the first plate 101a and the first bracket 101b) hold different vibrating members (i.e., the motor 100 and the driving shaft 104) and receive vibrations from these different vibrating members, respectively. As a second situation in the first embodiment, the multiple vibrating members (i.e., the pair of studs 106 and the driving shaft 104) are commonly held only by a prescribed holding unit (i.e., the second bracket 107b) thereby transmitting the vibrations only thereto so that another prescribed holding unit (i.e., the second plate 107a) does not directly receive the vibrations from these multiple vibrating members (i.e., the pair of studs 106 and the driving shaft 104).

In the former (i.e., first) situation, since the vibrations transmitted to the respective holding units from the vibrating members have different phases (i.e., shifted phases) from each the other and accordingly mutually interfere with each other, thereby reducing these own magnitudes while obtaining a vibration absorbing effect. By contrast, in the latter (i.e., second) situation, since the vibrations are transmitted initially to the prescribed first holding unit from the vibrating members and are secondary transmitted to the second holding unit via the prescribed first holding unit, the second holding unit secondarily vibrates. Accordingly, at that moment, since the vibrations of the first and second holding units have the different phases from each other and accordingly interfere with each other, magnitudes of the vibrations can be reduced with a vibration absorbing effect.

When both of the first and second situations are compared with each other, because the vibration of the second holding unit of the latter situation is a secondarily generated, the magnitude of the vibration is smaller and accordingly a degree of reduction of each of the vibrations caused by the interference of vibrations may be smaller. Accordingly, since the former first situation allows the greater reduction of vibration by the interference of vibrations, and the holding units and the peripheral mechanisms as well as the drive system as a whole can obtain the greater vibration reduction effects.

Hence, according to one embodiment the present invention, as one situation (i.e., a vibration traveling system), the motor 100 acts as a drive system to generate drive force and cause vibration by itself and directly communicates these drive force and vibration to the holding unit. In another situation according to one embodiment the present invention, a prescribed member, such as the driving shaft 104, etc., communicates the vibration caused by the drive force of the drive system to the holding unit upon receiving transmission of the vibration either directly or indirectly. Accordingly, in this point of view, another situation other than the situations as descried in the first embodiment can be considered, in which the first and second holding units directly receive transmissions of vibrations from different drive systems, respectively. Yet another situation can be also considered as well, in which the first and second holding units receive transmission of vibrations from vibrating members which receive the vibrations either directly or indirectly from different drive systems, respectively.

Figure 3:
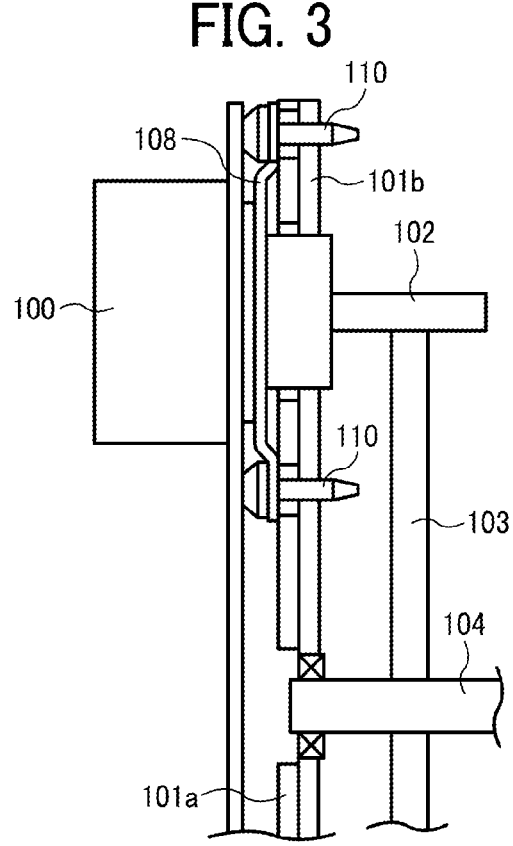
FIG. 3 is a cross-sectional view schematically illustrating a drive system according to a second embodiment of the present invention.
Figure 4:
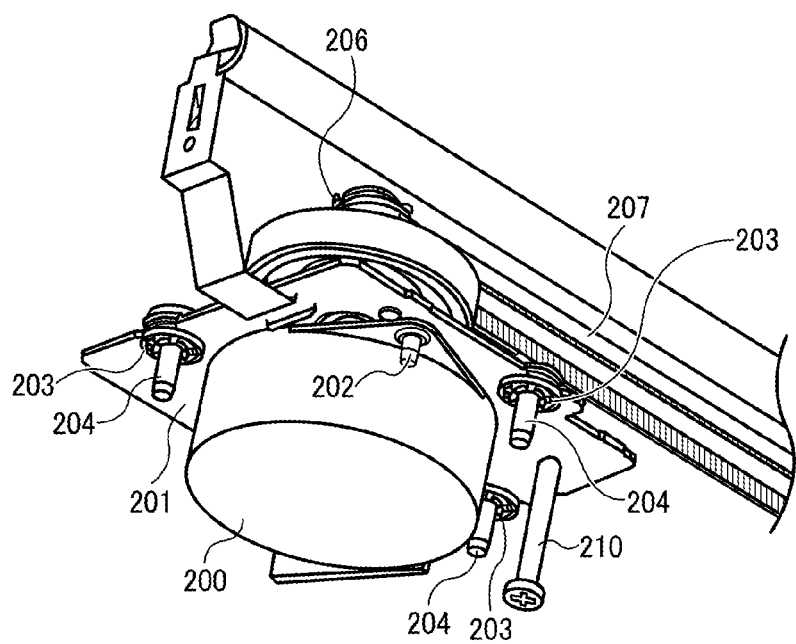
FIG. 4 is a diagram schematically illustrating a configuration of an image reading unit having a drive system employed in a conventional image forming apparatus.

Now, a drive system according to a second embodiment of the present invention is described with reference to FIG. 3 that schematically illustrates a cross-sectional view thereof. In the drive system of the second embodiment, the motor 100, the first plate 101a, and the first bracket 101b are fastened by a pair of screws 110. The motor 100 is held by both of the first plate 101a and the first bracket 101b. Similar to the drive system of the first embodiment, the motor 100 is connected to the driving target 105 through the motor gear 102, the gear 103, and the driving shaft 104 as well. The driving shaft 104 is held by the first bracket 101b as shown there. However, the driving target 105 is omitted here from the drawing.

Since the motor 100 is held by both of the first plate 101a and the first bracket 101b, vibration caused by the motor 100 is communicated to both the first plate 101a and the first bracket 101b. Also, vibration cause by the driving shaft 104 is transmitted to the first bracket 101b as well. Accordingly, at this moment, as in the drive system of the first embodiment, since the first plate 101a and the first bracket 101b are only partially coupled with and superimposed on each other, phases of the vibrations of both of the first plate 101a and the first bracket 101b deviate (i.e., shift) from each other, and accordingly the vibrations of the both of the first plate 101a and the first bracket 101b interference with each other thereby reducing the vibrations with a vibration absorbing effect. However, in the drive system of the second embodiment, the number of vibration transferring destinations is greater than that in the drive system of the first embodiment, because the motor 100 transmits its own vibration to both of the first plate 101a and the first bracket 101b. As a result, the total magnitude of the vibrations in the system as a whole may be greater than that in the drive system of the first embodiment.

Hence, according to the second embodiment, the first vibrating member (i.e., the motor 100) is held by both the first and second holding units (i.e., the first plate 101a and the first bracket 101b), while the second vibrating member (i.e., the driving shaft 104) is held only by one of the holding units (e.g., the first bracket 101b). In the second embodiment, however, the second vibrating member (i.e., the driving shaft 104) can be held by both the first and second holding units (i.e., the first plate 101a and the first bracket 101b).

Further, as shown there, the motor 100 of the second embodiment is positioned using a spigot joint 108 attached to the motor 100 and is screwed with a pair of screws 110 on the first plate 101a or the like. Then, the motor 100 as a unit is enabled to manually rotate around a motor axis as a rotational center thereof to change its fixed angular position regarding the first plate 101a in this second embodiment. Hence, by changing it and thereby adjusting the fixed angular position of the motor 100 in this way, the vibration can be mostly minimized.

Here, in the second embodiment, since securing of the motor 100 to the first plate 101a and partial securing of the first plate 101a to the first bracket 101b are made by the common screw 110 as shown, the number of components to be used to assemble the drive unit can be reduced.

Here to fore, the typical configurations of the drive system are described based on the first and second embodiments of the present invention. However, since multiple drive units are generally used inside of the image forming apparatus, and sizes of the motor 100 acting as the drive system and the driving target 105 vary depending on a function of the drive system or the like, it is important to appropriately select the first plate 101a and the first bracket 101b suitable to the respective drive system to obtain a greater vibration absorbing effect. In this context, an adjusting device that adjusts the vibration absorbing effect is herein below described more in detail with reference to applicable drawings.

The method of adjusting the vibration absorbing effect by changing the angular mounting position of the motor 100 is described earlier. However, the method of adjusting the vibration absorbing effect is not limited to that of changing the angular mounting position of the motor 100, but includes that of changing the connecting position of the first plate 101a acting as the holding unit to the first bracket 101b as well. For example, when both of the first plate 101a and the first bracket 101b are partially coupled with each other using the fastening screw, multiple screw holes are formed on each of the first plate 101a and the first bracket 101b at multiple locations thereon, respectively, to be optionally used to screw the first plate 101a on the first bracket 101b.

Further, in the drive systems of the above-described embodiments, only two sheet-like members, such as the first plate 101a, the first bracket 101b, etc., are superimposed on each other as the holding units. However, the number of sheet-like members to be superimposed on each other to constitute the holding units is not limited only to the two sheet-like members, and three, four, and more number of sheets can be also superimposed on each other by enhancing the number of sheet-like members as well. Furthermore, a thickness of each of the holding units to be superimposed is not necessarily the same as others, and only a specific holding unit can be either thicker or thinner than the other holding unit as well. That is, by differentiating the thickness of the first plate 101a from that of the first bracket 101b, for example, by either thinning or thickening the first plate 101a than the first bracket 101b and accordingly appropriately adjusting the thickness of the first plate 101a and the first bracket 101b, an optimal vibration absorbing effect with effective vibration reduction can be obtained at the same time as well.

Further, each of the holding units can be made of different material from others to obtain the optimal vibration absorbing effect with effective vibration reduction as well. That is, the first plate 101a may be made of material either to more easily communicate vibration than that of the first bracket 101b or to more hardly transmit the same than that of the first bracket 101b in order to obtain the optimal vibration absorbing effect with the effective vibration reduction.

Figure 5A:
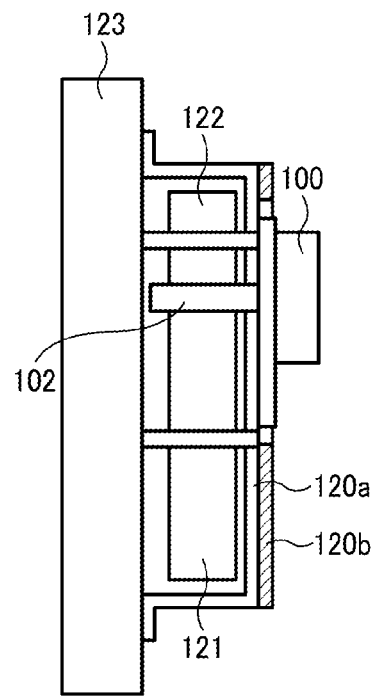
FIG. 5A is a cross-sectional view schematically illustrating a drive system according to a third embodiment of the present invention.
Figure 5B:
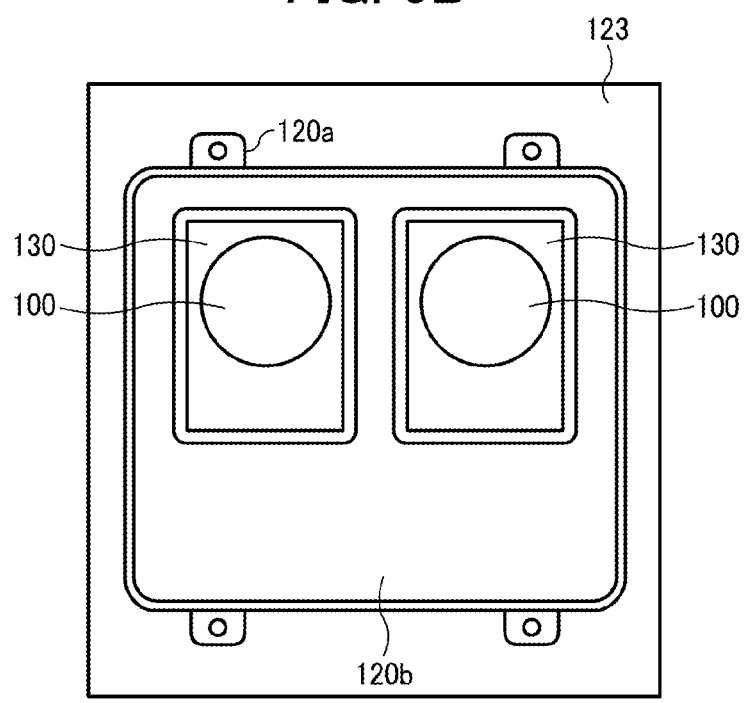
FIG. 5B is a front view schematically illustrating a configuration of the drive system of the third embodiment of the present invention.

Now, a drive system according to a third embodiment of the present invention is described with reference to FIGS. 5A and 5B, wherein FIG. 5A is a cross-sectional view schematically illustrating the drive system of the third embodiment of the present invention, and FIG. 5B is a front side view schematically illustrating a configuration of the drive system of the third embodiment of the present invention.

In the drive system of the third embodiment of the present invention, each of pair of motors 100 is held by a first plate 120a serving as a first holding unit, and is connected to the motor gear 102, a first gear 121, and a second gear 122 as well. The first plate 120a is positioned at a prescribed portion of a side plate 123. Drive force of the motor 100 is accordingly transmitted to each of units of a photoconductor and an intermediate transfer belt or the like via the motor gear 102, the first gear 121, and the second gear 122.

Also, onto the first plate 120a, a second plate 120b as a second holding unit is superimposed and is partially connected thereto with multiple screws, not shown. Hence, since the second plate 120b is superimposed on the first plate 120a, a total thickness of the first and second plates 120a and 120b increases more than that of one plate 120a or 120b, thereby enhancing the thickness and accordingly the rigidity thereof.

Hence, the vibration of the first plate 120a caused when the motor 100 transmits its drive force thereto can be minimized. The vibrations can be further reduced due to interfere of vibrations of these two first and second plates 120a and 120b as already discussed in the first embodiment of the present invention.

Furthermore, by adjusting the thickness of the second plate 120b in accordance with a magnitude of the vibration transmitted thereto, an optimal vibration absorbing effect with vibration reduction can be obtained.

Here, as shown in FIG. 5B, a pair of openings 130 is formed at sections in the second plate 120b, at which the pair of motors 100 is deployed, not to contact and avoid the pair of motors 100, respectively. If the opening 130 does not exist, since the motor 100 is necessarily placed on the second plate 120b, a width of the drive unit grows by an amount of the thickness of the second plate 120b as a result. Hence, due to provision of the opening 130, the second plate 120b can avoid contacting the motor 100 and a prescribed member that contacts the first plate 120a as well, thereby enabling the drive unit to maintained the width thereof (i.e., not to grow). For this reason, even when the thickness of the second plate 120b is adjusted to increase to be the optimal value for the purpose as described earlier, the total width of the drive unit does not change except for a situation in which the second plate 120b becomes thicker than the motor 100 in the third embodiment of the present invention.

In the driving device of the third embodiment, although the pair of motors 100 is typically disposed, only one or three or more motors 100 can be employed as well.

Figure 6:
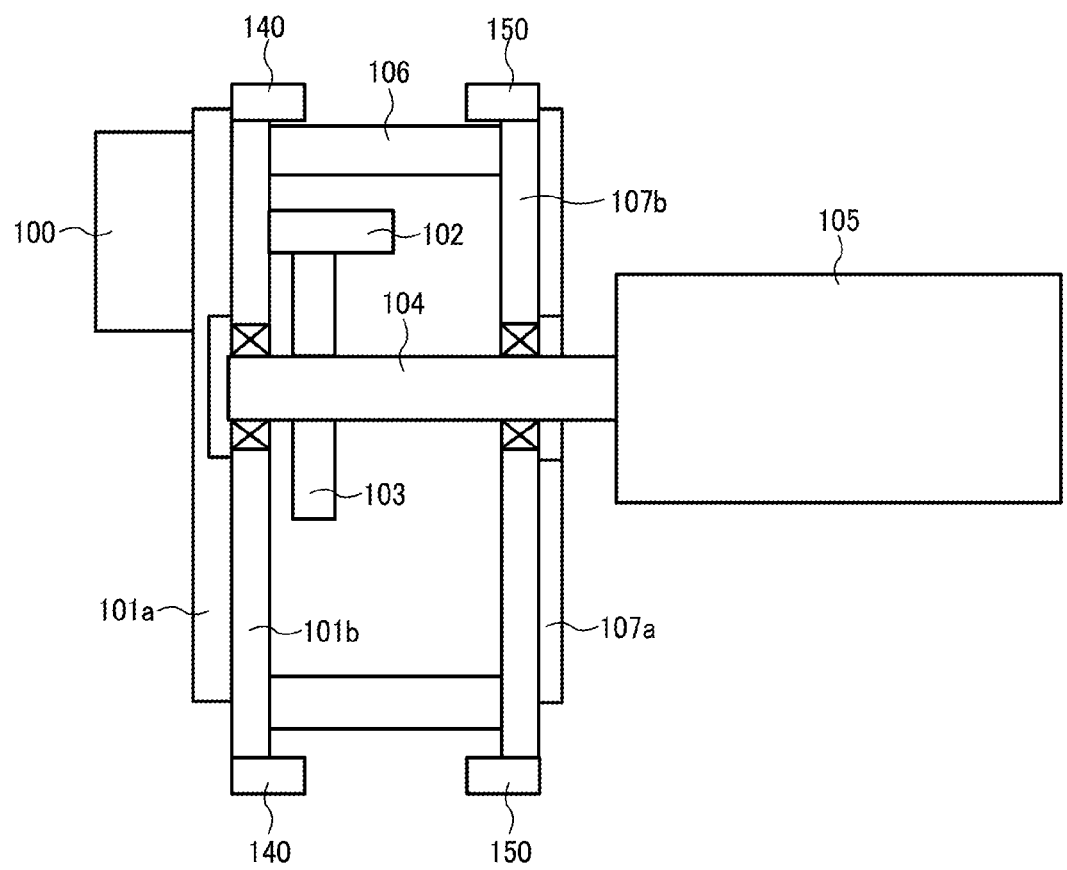
FIG. 6 is a cross-sectional view schematically illustrating a drive system according to a fourth embodiment of the present invention.

Now, a drive system according to a fourth embodiment of the present invention is described with reference to FIG. 6 that schematically illustrates a cross-sectional view of the drive system. The first bracket 101b and the second bracket 107b of the fourth embodiment have two pair of flanges 140 and 150 as reinforcing sections at their side ends, respectively. That is, by providing these two pair of flanges to the respective first and second brackets 101b and 107b brackets and thereby enhancing their strengths (i.e., rigidities), vibrations to be caused at these sections can be likely reduced.

Here, in the drive system of the fourth embodiment, the first plate 101a and the second plate 107a are shorter than the first bracket 101b and the second bracket 107b, respectively. Consequently, the two pair of flanges 140 and 150 of the first and the second brackets 101b and 107b do not overlap with the respective first and the second plates 101a and 107a.

Hence, as described previously, these two pair of flanges 140 and 150 are more rigid than the rest of these in the respective first and second brackets 101b and 107b, vibrations to be caused by these two pair of flanges 140 and 150 can be more effectively suppressed. As a result, at these two pair of flanges 140 and 150, a vibration absorbing effect obtained by superimposing the first and second plates 101a and 107a on each other is not necessarily required. Since the first and second plates 101a and 107a are not overlapped with the respective these two pair of flanges 140 and 150, the first plate 101a and the second plate 107a can be shortened, thereby reducing cost and weight of the drive system.

Hence, in the fourth embodiment, as the reinforcing sections of the holding units, although the flanges are provided to the respective brackets at their side ends, only a thickness of each of these side ends may be thickened to enhance the strength (i.e., rigidity) as well. Further, if vibration transmitted to each of the first and second plates 101a and 107a is larger than that transmitted to each of the first and second brackets, the reinforcing section can be established in each of first and second plates 101a and 107a, for example.

Further, the image forming apparatus employed in the various embodiments of the present invention is not limited to the color image forming apparatus as shown in FIG. 1, and can be a monochrome image forming apparatus, such as a copier, a printer, a facsimile machine, etc., and a complex machine prepared by combining multiple functions of these devices.

Accordingly, according to one aspect of the present invention, because the first and second holding units are only partially connected to each other, although vibrations transmitted from vibrating members are transmitted to first and second holding units, the first and second holding units do not vibrate synchronizingly, and accordingly phases of the vibrations of these first and second holding units are shifted from each other, the vibrations of those first and second holding units interfere with each other thereby reducing magnitudes of these vibrations. Consequently, the vibrations transmitted to and traveling from the holding units can be absorbed and reduced at the same time while also reducing a noise in the entire drive system. That is, a drive system includes at least one vibrating member to generate vibration when it is driven, and a holding system to hold the at least one vibrating member. The holding system at least includes a first holding unit and a second holding unit superimposed on and partially connected to each other.

According to another aspect of the present invention, the vibrations transmitted to and traveling from the holding units can be effectively absorbed and reduced at the same time while also reducing a noise in the entire drive system. That is, the at least one vibrating member is at least composed of a first vibrating member and a second vibrating member.

According to yet another aspect of the present invention, the vibrations transmitted to and traveling from the holding units can be more effectively absorbed and reduced at the same time while also reducing a noise in the entire drive system. That is, the first vibrating member is held by the first holding unit and is not held by the second holding unit, and the second vibrating member is held by the second holding unit and is not held by the first holding unit.

According to yet another aspect of the present invention, the vibrations transmitted to and traveling from the holding units can be more effectively absorbed and reduced at the same time while also reducing a noise in the entire drive system. That is, the first vibrating member is held by both of the first holding unit and the second holding unit, and the second vibrating member is held by at least one of the first holding unit and the second holding unit.

According to yet another aspect of the present invention, the vibrations transmitted to and traveling from the holding units can be more effectively absorbed and reduced at the same time while also reducing a noise in the entire drive system. That is, both of the first vibrating member and the second vibrating member are held by one of the first holding unit and the second holding unit, and both of the first vibrating member and the second vibrating member are not held by the other one of the first holding unit and the second holding unit.

According to yet another aspect of the present invention, the vibrations transmitted to and traveling from the holding units can be more effectively absorbed and reduced at the same time while also reducing a noise in the entire drive system. That is, any one or both of the first vibrating member and the second vibrating member is a driving device or driving devices to drive by itself or themselves as a drive source or drive sources.

According to yet another aspect of the present invention, the vibrations transmitted to and traveling from the holding units can be more effectively absorbed and reduced at the same time while also reducing a noise in the entire drive system. That is, a thickness of each of the first holding unit and the second holding unit in an overlapping direction in which the first holding unit and the second holding unit are superimposed, is enabled to vary in accordance with a magnitude of vibration transmitted to each of the first holding unit and the second holding unit.

According to yet another aspect of the present invention, the vibrations transmitted to and traveling from the holding units can be more effectively absorbed and reduced at the same time while also reducing a noise in the entire drive system. That is, the first holding unit and the second holding unit are made of different material from each other.

According to yet another aspect of the present invention, the vibrations transmitted to and traveling from the holding units can be more effectively absorbed and reduced at the same time while also reducing a noise in the entire drive system. That is, a connecting position, at which the first holding unit and the second holding unit connect to each other, is enabled to vary in accordance with a magnitude of vibration transmitted to the first holding unit and the second holding unit.

According to yet another aspect of the present invention, the vibrations transmitted to and traveling from the holding units can be more effectively absorbed and reduced at the same time while also reducing a noise in the entire drive system. That is, the second holding unit is shaped not to contact any one of the first and second vibrating members contacting the first holding unit.

According to yet another aspect of the present invention, the vibrations transmitted to and traveling from the holding units can be more effectively absorbed and reduced at the same time while also reducing a noise in the entire drive system. That is, a thickness of the second holding unit in an overlapping direction, in which the first holding unit and the second holding unit are superimposed, is enabled to vary in accordance with a magnitude of vibration transmitted to the second holding unit.

According to yet another aspect of the present invention, the vibrations transmitted to and traveling from the holding units can be more effectively absorbed and reduced at the same time while also reducing a noise in the entire drive system. That is, a strengths or a rigidity of one of the first holding unit and the second holding unit receiving transmission of a greater magnitude of the vibration than that of the other one of the first holding unit and the second holding unit is set higher than that of the other one of the first holding unit and the second holding unit.

According to yet another aspect of the present invention, the vibrations transmitted to and traveling from the holding units can be more effectively absorbed and reduced at the same time while also reducing a noise in the entire drive system. That is, the rigidity of one of the first holding unit and the second holding unit is enhanced by thickening the one of the first holding unit and the second holding unit that receives transmission of a greater magnitude of the vibration than the other one of the first holding unit and the second holding unit.

According to yet another aspect of the present invention, the vibrations transmitted to and traveling from the holding units can be more effectively absorbed and reduced at the same time while also reducing a noise in the entire drive system. That is, one of the first holding unit and the second holding unit includes a reinforced portion at its prescribed position, the reinforced portion having a greater rigidity than the rest of the reinforced portion in one of the first holding unit and the second holding unit. The reinforced portion excludes a portion in which the first holding unit and the second holding unit are superimposed on and partially connected to each other.

Numerous additional modifications and variations of the present invention are possible in light of the above teachings. It is therefore to be understood that within the scope of the appended claims, the present invention may be executed otherwise than as specifically described herein. For example, the drive system and the image forming apparatus with the same are not limited to the above-described various embodiments and may be altered as appropriate.

What is claimed is:

1. A drive system comprising:
   at least one vibrating member to generate vibration when it is driven; and
   a holding system to hold the at least one vibrating member, wherein
      the holding system at least includes a first holding unit and a second holding unit, the first holding unit and the second holding unit superimposed on and partially connected to each other, and
      a thickness of each of the first holding unit and the second holding unit in a direction in which the first holding unit and the second holding unit are superimposed is variable in accordance with a magnitude of vibration transmitted to each of the first holding unit and the second holding unit.

2. The drive system as claimed in claim 1, wherein the at least one vibrating member comprises a first vibrating member and a second vibrating member.

3. The drive system as claimed in claim 2, wherein the first vibrating member is held by the first holding unit and is not held by the second holding unit, and the second vibrating member is held by the second holding unit and is not held by the first holding unit.

4. The drive system as claimed in claim 2, wherein the first vibrating member is held by both of the first holding unit and the second holding unit, wherein the second vibrating member is held by at least one of the first holding unit and the second holding unit.

5. The drive system as claimed in claim 2, wherein both of the first vibrating member and the second vibrating member are held by one of the first holding unit and the second holding unit, and neither the first vibrating member nor the second vibrating member is held by the other one of the first holding unit and the second holding unit.

6. The drive system as claimed in claim 2, wherein at least one of the first vibrating member and the second vibrating member is a driving device to drive itself as a drive source.

7. An image forming apparatus comprising:
   the drive system as claimed in claim 1.

8. A drive system comprising:
   at least one vibrating member to generate vibration when it is driven; and
   a holding system to hold the at least one vibrating member, wherein
      the holding system at least includes a first holding unit and a second holding unit, the first holding unit and the second holding unit superimposed on and partially connected to each other, and
      the first holding unit and the second holding unit are made of different materials.

9. A drive system comprising:
at least one vibrating member to generate vibration when it is driven; and
a holding system to hold the at least one vibrating member, wherein
the holding system at least includes a first holding unit and a second holding unit, the first holding unit and the second holding unit superimposed on and partially connected to each other, and
a connecting position, at which the first holding unit and the second holding unit connect to each other, is changeable in accordance with a magnitude of vibration transmitted to the first holding unit and the second holding unit.

10. A drive system comprising:
at least one vibrating member to generate vibration when it is driven; and
a holding system to hold the at least one vibrating member, wherein
the holding system at least includes a first holding unit and a second holding unit, the first holding unit and the second holding unit superimposed on and partially connected to each other, and
the second holding unit is shaped not to contact either the first vibrating member or the second vibrating member contacting the first holding unit.

11. The drive system as claimed in claim 10, wherein a thickness of the second holding unit in a direction, in which the first holding unit and the second holding unit are superimposed, is variable in accordance with a magnitude of vibration transmitted to the second holding unit.

12. A drive system comprising:
at least one vibrating member to generate vibration when it is driven; and
a holding system to hold the at least one vibrating member, wherein
the holding system at least includes a first holding unit and a second holding unit, the first holding unit and the second holding unit superimposed on and partially connected to each other, and
one of the first holding unit and the second holding unit has a greater rigidity than the other one of the first holding unit and the second holding unit.

13. The drive system as claimed in claim 12, wherein the one of the first holding unit and the second holding unit is thicker than the other one of the first holding unit and the second holding unit.

14. A drive system comprising:
at least one vibrating member to generate vibration when it is driven; and
a holding system to hold the at least one vibrating member, wherein
the holding system at least includes a first holding unit and a second holding unit, the first holding unit and the second holding unit superimposed on and partially connected to each other, and
one of the first holding unit and the second holding unit includes a reinforced portion having enhanced rigidity, the reinforced portion excluding a portion in which the first holding unit and the second holding unit are superimposed on and partially connected to each other.

* * * * *